United States Patent
Peng

(10) Patent No.: US 9,321,314 B2
(45) Date of Patent: Apr. 26, 2016

(54) WIRELESS SENSOR FOR SENSING TEMPERATURE AND PRESSURE WITHIN DUAL PASSAGE

(71) Applicant: Ta-Min Peng, Taipei (TW)

(72) Inventor: Ta-Min Peng, Taipei (TW)

( * ) Notice: Subject to any disclaimer, the term of this patent is extended or adjusted under 35 U.S.C. 154(b) by 200 days.

(21) Appl. No.: 14/222,710

(22) Filed: Mar. 24, 2014

(65) Prior Publication Data

US 2015/0217606 A1 Aug. 6, 2015

(30) Foreign Application Priority Data

Feb. 6, 2014 (TW) .............................. 103202165 U

(51) Int. Cl.
*B60C 23/04* (2006.01)

(52) U.S. Cl.
CPC ......... *B60C 23/0496* (2013.01); *B60C 23/0455* (2013.01)

(58) Field of Classification Search
None
See application file for complete search history.

(56) References Cited

U.S. PATENT DOCUMENTS

| 2007/0193349 | A1* | 8/2007 | Petrucelli | B60C 23/0496 73/146.8 |
|---|---|---|---|---|
| 2010/0031741 | A1* | 2/2010 | Achterholt | B60C 23/0494 73/146.3 |
| 2012/0222477 | A1* | 9/2012 | Yu | B60C 23/0471 73/146 |
| 2012/0222478 | A1* | 9/2012 | Kanenari | B60C 23/0408 73/146.5 |
| 2013/0009762 | A1* | 1/2013 | Yu | B60C 23/0494 340/442 |
| 2015/0029016 | A1* | 1/2015 | Lesesky | B60C 23/045 340/442 |
| 2015/0210126 | A1* | 7/2015 | Arnoldo | B60C 23/0498 73/146.5 |

\* cited by examiner

*Primary Examiner* — Andre Allen
(74) *Attorney, Agent, or Firm* — Cheng-Ju Chiang

(57) ABSTRACT

Disclosed is a wireless sensor for sensing temperature and pressure within a dual passage shell. The wireless sensor comprises a dual passage shell, an intake valve, an exhaust valve, a power supplying module, and a circuit board. The dual passage shell includes a cover, a base body, and a fixing receptacle. A receiving space is formed by assembling the cover and the base body. An air chamber is formed by disposing the fixing receptacle in the receiving space and by combining the base body. The base body is provided with an intake passage and an exhaust passage both communicating with the air chamber. The intake valve is provided and integrally formed within the intake passage. The exhaust valve is provided and integrally formed with the exhaust passage. Thus, a user can inflate the tire without disassembling wireless sensor, and the usage convenience of the wireless sensor is enhanced.

10 Claims, 4 Drawing Sheets

WIRELESS SENSOR FOR SENSING TEMPERATURE AND PRESSURE WITHIN DUAL PASSAGE

FIELD OF THE INVENTION

The present invention relates to a wireless sensor for sensing temperature and pressure, and more particularly, to a wireless sensor for sensing temperature and pressure within a dual passage.

BACKGROUND OF THE INVENTION

Conventional tire pressure measurement is achieved by installing a sensor on the gas nozzle of the tire, and then measuring the tire pressure or tire temperature of the gas escaping from the gas nozzle, and removing the sensor after the measurement is completed. This measuring method requires installing and removing the sensor for each measurement, so it is inconvenient.

Alternatively, some other sensors can be permanently installed on the gas nozzle in order to allow the user to monitor tire pressure or tire temperature at any time. However, when the tire pressure is insufficient and requires inflation, the sensor still needs to be removed from the gas nozzle for installing the pump tool for inflating the tire, so it is still inconvenient for a user.

In view of the circumstances, the present invention provided a wireless sensor for sensing temperature and pressure within a dual passage in order to obtain a better usage convenience.

SUMMARY OF THE INVENTION

The object of the present invention is to provide a wireless sensor for sensing temperature and pressure within a dual passage shell, in which the wireless sensor of the present invention is capable of instantly and accurately detecting the temperature and the pressure of the air within the tire, and allowing a user to directly inflate the tire without disassembling the wireless sensor.

The another object of the present invention is to provide a wireless sensor for sensing temperature and pressure within a dual passage shell, wherein the transmitting antenna is substantially perpendicular to a horizontal surface of the circuit board to downwardly extend to the dual passage shell and is non-electrically connected with the battery and the wheel rim, so as to effectively transmit wireless signals and prevent signal attenuation.

The another object of the present invention is to provide a wireless sensor for sensing temperature and pressure within a dual passage shell, wherein a screw fastening member is provided between the base body and the cover for assembling the base body with the cover, such that the cover can be removed for replacing the battery.

The another object of the present invention is to provide a wireless sensor for sensing temperature and pressure within a dual passage shell, wherein the base body extends outwardly to form a hexagonal sleeve at which the exhaust passage is located at, so that the wireless sensor can be assemble and disassemble by using a special sleeve when the wireless sensor is install on an inner wheel of a truck.

The another object of the present invention is to provide a wireless sensor for sensing temperature and pressure within a dual passage shell, wherein an external groove wall of the exhaust passage of the base body is provided with an external thread for thread-engaging an external pumping device, such that the external pumping device is able to directly inflate the tire through the exhaust valve.

In order to achieve the above object, the present invention is to provide a wireless sensor for sensing temperature and pressure within a dual passage shell, which includes: a dual passage shell, an intake valve, an exhaust valve, a circuit board, a power supplying module, and a transmission antenna. The dual passage shell includes a cover, a base body, and a fixing receptacle. A receiving space is formed by assembling the cover and the base body. An air chamber is formed by disposing the fixing receptacle in the receiving space and by combining the base body. The base body is provided with an intake passage and an exhaust passage both communicating with the air chamber. The intake valve is provided and integrally formed within the intake passage. The exhaust valve is provided and integrally formed with the exhaust passage. The circuit board is disposed on the fixing receptacle and is provided with a wireless transmitting module, a sensing module with corresponds to the air chamber, and an antenna socket in which the transmission antenna is plugged. The power supplying module being provided with a battery, being disposed on the fixing receptacle, and being connected with the circuit board.

With the characteristic features as above, the intake valve is assembled to the air nozzle, so that it can instantly and accurately detect the temperature and the pressure of the air and instantly transmit the data to a user by the transmission antenna. In addition, through the exhaust passage, a user can inflate the tire without disassembling wireless sensor, and the wireless sensor of the present invention can detect the tire pressure while inflating the tire, by which the usage convenience of the wireless sensor is enhanced. Furthermore, the base body and the cover are thread-engaged by the screw fastening member that is removable, so the battery can be replaced by a user when the battery is exhausted. Moreover, the design of the hexagonal sleeve and special sleeve can be easily assembled and disassembled, and can be combined with an anti-theft nut to provide an anti-theft effect.

In order to better understand the characteristic, features and technical means adopted by the present invention, please refer to the following detailed description and accompanied drawings related to the present invention. However, the accompanying drawings are merely used for explaining the embodiments of the present invention but not for limiting the scope of the present invention.

DETAILED DESCRIPTION OF THE PREFERRED EMBODIMENTS

Figure 1:
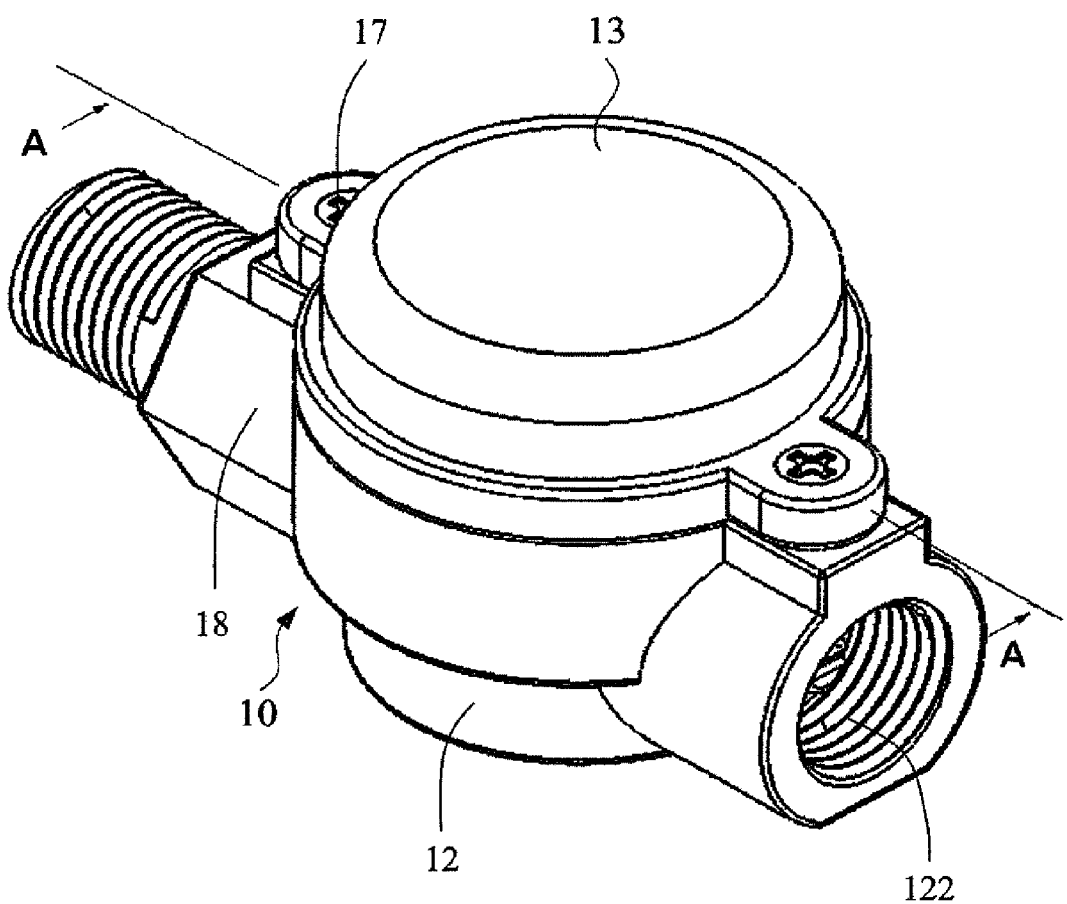
FIG. 1 is a stereogram illustrating a wireless sensor according to an embodiment of the present invention.
Figure 2:
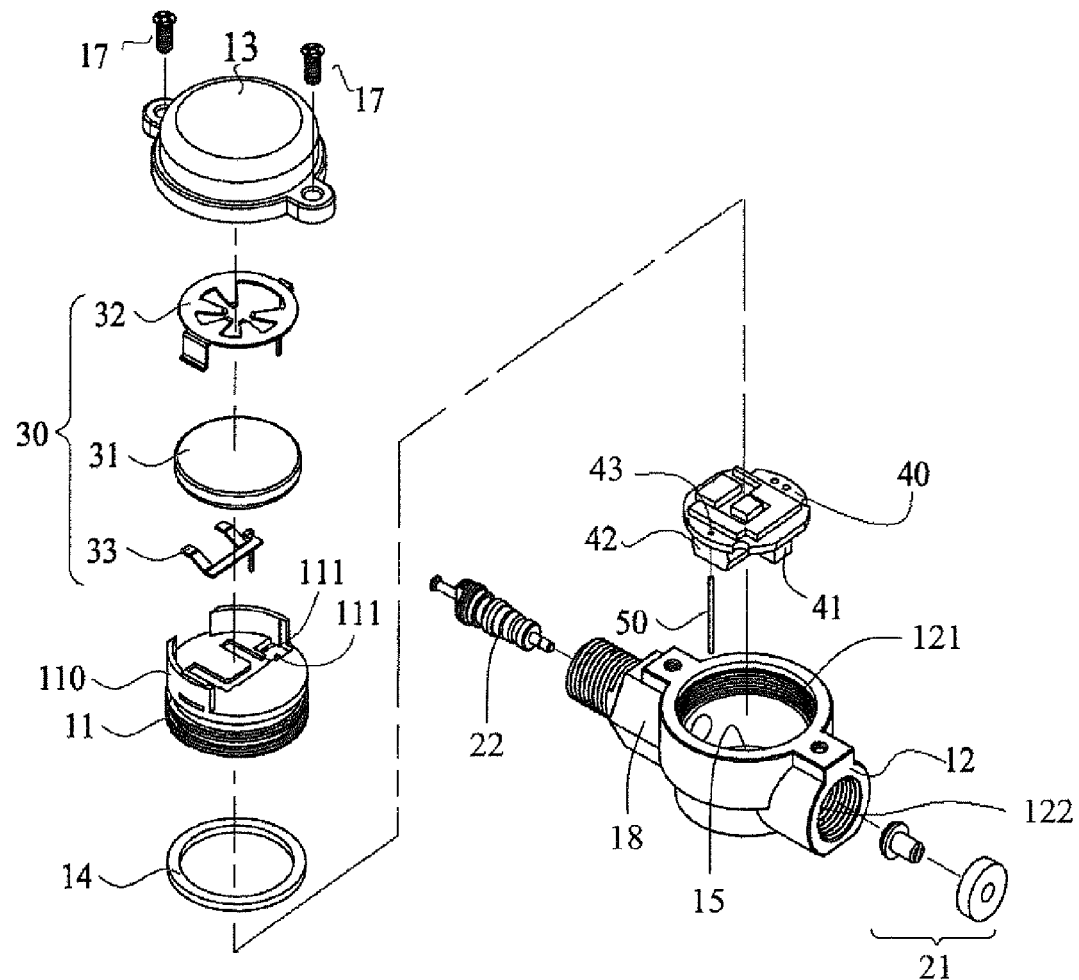
FIG. 2 is an explosion diagram illustrating the wireless sensor of the present invention.
Figure 3:
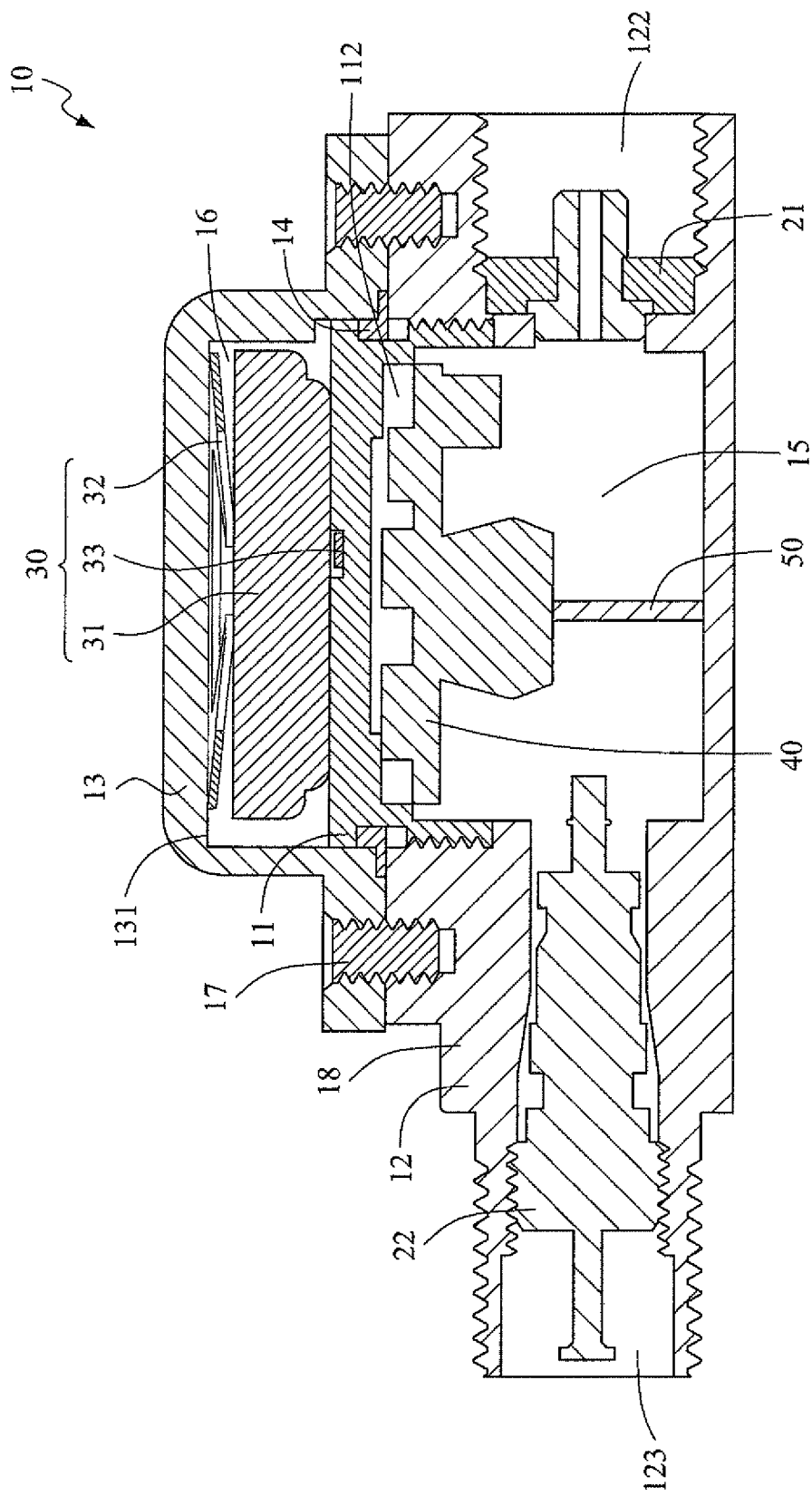
FIG. 3 is a cross-sectional diagram taken along a section line A of FIG. 1.
Figure 4:
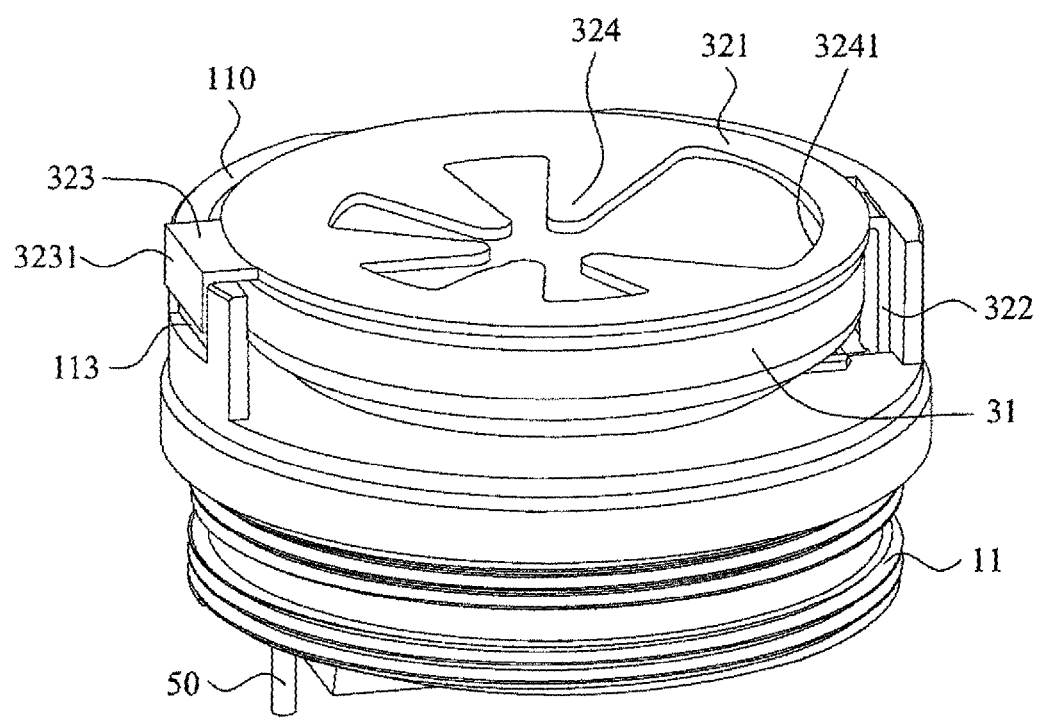
FIG. 4 is a stereogram illustrating a power supplying module disposed on the fixing receptacle of the wireless sensor of the present invention.

As referred to FIG. 1 to FIG. 4, a wireless sensor for sensing temperature and pressure within a dual passage shell is provided in the present invention. The wireless sensor 100 is connected to a gas nozzle of a car tire for sensing the gas pressure and gas temperature within the car tire, such that the usage condition of the car tire can be noticed by a car's owner/driver, thereby the driving safety can be improved. The wireless sensor includes a dual passage shell 10, an intake valve 21, an exhaust valve 22, a power supplying module 30, a circuit board 40, and a transmission antenna 50.

The dual passage shell 10 is connected to the gas nozzle, and includes a fixing receptacle 11, a base body 12 provided with a groove 121, and a cover 13 provided with a groove 131. The fixing receptacle 11 is provided with a circular lateral wall on a lower side of the fixing receptacle 11, and the fixing receptacle 11 is assembled with the base body 12 to form an air chamber 15 therein. In this embodiment, a lower side of the fixing receptacle 11 is provided with a corresponding recess 112 that is formed on the inner side of the circular lateral wall. An exterior surface of the circular lateral wall is provided with an external thread, and an interior surface of the grooves 121 of the base body 12 is provided with an internal thread. The internal thread is for thread-engaging with the exterior surface of the circular lateral wall of the fixing receptacle 11 and be connected with the corresponding recess 112 of the fixing receptacle 11 to form the air chamber 15. A junction between the interior surface of the grooves 121 and the exterior surface of the circular lateral wall is coated with a bonding agent for improving the air tightness of the air chamber 15 to achieve a complete air tightness, thus to improve the measurement accuracy. A semicircular sidewall 110 is provided on an upper side of the fixing receptacle 11. A receiving space 16 is formed within the dual passage shell 10 by the assembly of the base body 12 and the cover 13. In this embodiment, a screw fastening member 17 is provided between the base body 12 and the cover 13 for assembling the base body 12 with the cover 13. The fixing receptacle 11 is provided with two holes 111 which penetrate through the fixing receptacle 11. Preferably, the fixing receptacle 11 is further assembled with a plastic sealing ring 14 that is disposed in a gutter provided in a middle portion of an outer edge of the fixing receptacle 11, so that the receiving space 16 can be closed more tightly to prevent from moisture ingress.

The base body 12 is provided with an intake passage 122 and an exhaust passage 123 both communicating with the air chamber 15. The intake valve 21 is provided and integrally formed within the intake passage 122. An internal sidewall of the intake passage 122 is provided with an internal thread for thread-engaging with the air nozzle. The base body 12 extends outwardly to form a hexagonal sleeve 18 at which the exhaust passage 123 is located at. The hexagonal sleeve 18 requires a special tool to grip and rotate, therefore, when the intake passage 122 of the base body 12 is thread-engaged with the air nozzle, the base body 12 can not be rotated for the intake passage 122 to be disassembled from the air nozzle without using the special tool to grip and rotate the hexagonal sleeve 18. Therefore, combination of the hexagonal sleeve 18 and a special sleeve provide convenience for disassembling, and the combination of the hexagonal sleeve 18 combined with an anti-theft nut provide an anti-theft effect. The inner groove wall of the exhaust passage 123 of the base body 12 is provided with an internal thread, and the exhaust valve 22 is provided with an external thread that corresponds to the internal thread. The internal thread is thread-engaged with the external thread so as to combine the exhaust valve 22 within the exhaust passage 123. An external groove wall of the exhaust passage 123 of the base body 12 is provided with an external thread for thread-engaging with an external pumping device. Therefore, with the design of the dual passage shell of the base body 12, the intake passage 122 is thread-engaged with the air nozzle to guide the air of the car tire into the air chamber 15, so that the pressure and the temperature of the air in the car tire can be measured. An external groove wall of the exhaust passage 123 is provided with an external thread similar to the nozzle for thread-engaging with an external pumping device, and by which the air can be guided from the exhaust valve 22 to the air chamber 15.

The power supplying module 30 is disposed on the fixing receptacle 11 and is received in the receiving space 16. The power supplying module 30 includes a battery 31, a first conducting element 32 and a second conducting element 33. An end of the first conducting element 32 and an end of the second conducting element 33 are respectively inserted into the two holes 111 of the fixing receptacle 11 and are respectively electrically connected to the circuit board 40, and another end of the first conducting element 32 and another end of the second conducting element 33 are respectively electrically connected to two electrodes of the battery 31. The first conducting element 32 and the second conducting element 33 are respectively disposed on a upper side and a lower side of the battery 31, and an end of the first conducting element 32 is provided as crossing the battery 31 and is inserted into the hole 111 of the fixing receptacle 11. Thus the battery 31 is griped between the first conducting element 32 and the second conducting element 33, and is disposed on the fixing receptacle 11. Since a side of the upper side of the fixing receptacle 11 is a semicircular sidewall 110, therefore a semicircular recess is formed at the other side of the upper side of the fixing receptacle 11, and the battery 31 can be removed therefrom for replacement. In this embodiment, the first conducting element 32 is provided with an outer ring portion 321, two extending portions 322, 323, and a plurality of claw-shaped spring plates 324. The claw-shaped spring plates 324 inwardly protrudes and downwardly contacts the battery 31, and there is at least one large gap 3241 provided between the plurality of claw-shaped spring plate 324 for shifting the position of the battery 31 that is to be removed and replaced. The extending portions 322, 323 downwardly extend from two opposite ends of the outer ring portion 321 and cross the battery, wherein the extending portion 322 is inserted into the hole 111 of the fixing receptacle 11, and the extending portion 323 is provided with a clasp 3231 and is fasten on a clasp slot 113 of the semicircular sidewall 110 of the fixing receptacle 11. In addition, after the screw fastening member 17 is released to open the cover 13, the battery 31 can be easily replaced without disassembling the wireless sensor, so as to provide a better usability.

The circuit board 40 is disposed on the fixing receptacle 11 and is electrically connected to the first conducting element 32 and the second conducting element 33. The circuit board 40 is provided with a wireless transmitting module 41, a sensing module 42, and an antenna socket 43, wherein the circuit board 40 is electrically connected to the wireless transmitting module 41 and the sensing module 42. The sensing module 42 is in correspondence with the air chamber 15 and transmitting a detected value to the circuit board 40, wherein the detection value is converted to a wireless signal and is sent out by the antenna 50 via the wireless transmitting module 41. In this embodiment, the wireless transmitting module 41 is disposed on the bottom of the circuit board 40. The sensing module 42 is disposed on the bottom of the circuit board 40 and is corresponding to the air chamber 15. The antenna socket 43 is connected to the wireless transmitting module 41. By means of having the sensing module 42 to be in correspondence with the air chamber 15 of the base body 12, and having the intake valve 21 integrally formed within the intake passage 122, the sensing module 42 is able to directly detect the air exhausted from the intake valve 21 to the air chamber 15, and thereby the temperature and the pressure of the air can be instantly and accurately detected. Moreover, by means of wireless transmitting via the wireless transmitting module, a control program to be updated can be written to the sensing module 42, such that the configuration of the control program can be modified whenever necessary, and the data stored in the circuit board 40 can be read in the manner of wireless transmission.

An end of the transmission antenna 50 is received in the antenna socket 43 and is electrically connecting to the circuit board 40, and the transmission antenna is downwardly extending from the circuit board 40 to the base body to form a rod-shaped antenna. Preferably, a junction between the transmission antenna 50 and the antenna socket 43 is coated with a bonding agent to prevent from air leaks. In this embodiment, the transmission antenna 50 is a substantial circular rod-shaped metal conductor, but the present invention is not limited to this. By means of disposing the transmitting antenna 50 into the antenna socket 43 of the circuit board 40 and having the transmitting antenna 50 to downwardly extend along a direction that is substantially perpendicular to a horizontal surface of the circuit board 40 to contact the base body 12 of the dual passage shell 10, a better electromagnetic pattern can be formed between the transmitting antenna 50 and the power supplying module 30 for transmitting wireless signals and prevent signal attenuation. In other words, because the extending direction of the transmitting antenna 50 is substantially perpendicular to the horizontal surface of the circuit board 40 and the horizontal surface of the battery 31, the wireless transmission of the transmitting antenna 50 is less susceptible to the microwave radiation generated by the operation of the circuit board 40 and the battery 31, and thus the effect of the wireless transmission is better. In detail, the principle of the wireless transmission in the present invention is similar to that of a regular antenna transmission where the antenna is perpendicular to the ground so that the transmission distance can be increased. Moreover, because the rod-shaped antenna is provided with a flexibility, so when there is a vibration generated by an operating car, the transmitting antenna 50 with the flexibility is able to absorb the vibration and maintain contact with the base body 12, by which the present invention is able to effectively improve the problems of the imperfect contact due to the detachment of the metal contacts in conventional art.

The above are the preferred possible embodiments of the present invention, which are not to limit the scope of right of the present invention, so the equivalent structural changes according to the content of the specification and the drawings of the present invention are considered to be included within the scope of right of the present invention.

What is claimed is:

1. A wireless sensor for sensing temperature and pressure within a dual passage shell, comprising:
   a dual passage shell including a cover, a base body, and a fixing receptacle, wherein a receiving space is formed by assembling the cover and the base body, and an air chamber is formed by disposing the fixing receptacle in the receiving space and by combining the base body, the base body is provided with an intake passage and an exhaust passage both communicating with the air chamber;
   an intake valve being provided and integrally formed within the intake passage;
   an exhaust valve being provided and integrally formed with the exhaust passage;
   a circuit board being disposed on the fixing receptacle and being provided with a wireless transmitting module, a sensing module which corresponds to the air chamber, and an antenna socket in which a transmission antenna is plugged; and
   a power supplying module being provided with a battery, being disposed on the fixing receptacle, and being connected with the circuit board.

2. The wireless sensor of claim 1, wherein the transmitting antenna is perpendicular to a horizontal surface of the circuit board to downwardly extend to the dual passage shell.

3. The wireless sensor of claim 1, further comprising a screw fastening member being provided between the base body and the cover for assembling the base body with the cover.

4. The wireless sensor of claim 1, wherein an inner groove wall of the exhaust passage of the base body is provided with an internal thread, and the exhaust valve is provided with an external thread that is corresponding to the internal thread.

5. The wireless sensor of claim 1, wherein the base body extends outwardly to form a hexagonal sleeve at which the exhaust passage is located at.

6. The wireless sensor of claim 1, wherein an external groove wall of the exhaust passage of the base body is provided with an external thread for thread-engaging an external pumping device.

7. The wireless sensor of claim 1, wherein the fixing receptacle is further assembled with a plastic sealing ring which is disposed within a gutter which is provided in a middle portion of an outer edge of the fixing receptacle.

8. The wireless sensor of in claim 1, wherein the power supplying module further comprises a first conducting element and a second conducting element, an end of the first conducting element and an end of the second conducting element are respectively electrically connected to the circuit board, and another end of the first conducting element and another end of the second conducting element are respectively electrically connected to two electrodes of the battery.

9. The wireless sensor of claim 8, wherein the fixing receptacle is provided with two holes, and the first conducting element and the second conducting element are respectively inserted into the two holes to connect to the circuit board.

10. The wireless sensor of claim 8, wherein the first conducting element and the second conducting element are respectively disposed in upper side and lower side of the battery, and one end of the first conducting element is provided as crossing the battery for being connected with the circuit board.

* * * * *